United States Patent [19]

Walles et al.

[11] Patent Number: 4,915,912
[45] Date of Patent: * Apr. 10, 1990

[54] APPARATUS FOR THE GENERATION OF SULFUR TRIOXIDE REAGENT AND SULFONATION OF THE SURFACE OF POLYMERIC RESINS

[75] Inventors: Wilhelm E. Walles, Freeland; Donald L. Tomkinson, Auburn, both of Mich.

[73] Assignee: The Dow Chemical Company, Midland, Mich.

[*] Notice: The portion of the term of this patent subsequent to Feb. 20, 2007 has been disclaimed.

[21] Appl. No.: 190,313

[22] Filed: May 4, 1988

[51] Int. Cl.$^4$ ............................................ C01B 17/48
[52] U.S. Cl. .................................... 422/160; 422/161; 422/292; 422/298; 423/522; 423/532; 260/686
[58] Field of Search ................ 423/522, 532; 422/160, 422/161, 292, 298; 260/686

[56] References Cited

U.S. PATENT DOCUMENTS

| | | | |
|---|---|---|---|
| 2,281,762 | 5/1942 | Grace | 423/539 A |
| 2,832,696 | 4/1958 | Walles | 423/532 |
| 2,854,477 | 9/1958 | Steinhauer | 423/533 |
| 2,937,066 | 5/1960 | Walles | 428/412 |
| 2,945,842 | 7/1960 | Eichhern | 423/533 |
| 3,296,096 | 1/1967 | Portman et al. | 423/532 |
| 3,363,994 | 1/1968 | Brooks et al. | 260/686 |
| 3,592,724 | 7/1971 | Walles | 260/793 |
| 3,613,957 | 10/1971 | Walles | 220/64 |
| 3,625,751 | 12/1971 | Walles | 117/118 |
| 3,629,025 | 12/1971 | Walles | 260/79.3 R |
| 3,770,706 | 11/1973 | Walles | 428/412 |
| 3,803,297 | 4/1974 | Guth | 423/533 |
| 3,880,985 | 4/1975 | Haeseler | 423/533 |
| 3,959,561 | 5/1976 | Walles | 428/412 |
| 3,998,180 | 12/1976 | Hawkins | 427/237 |
| 4,046,866 | 9/1977 | Hurlburt | 423/532 |
| 4,213,958 | 7/1980 | Cameron | 423/532 |
| 4,220,739 | 9/1980 | Walles | 525/344 |
| 4,520,003 | 5/1985 | Peterson | 423/533 |
| 4,615,914 | 10/1986 | Walles | 427/237 |
| 4,643,887 | 2/1987 | Daley | 423/533 |
| 4,663,142 | 5/1987 | Cameron et al. | 423/432 |
| 4,663,142 | 5/1987 | Cameron | 423/532 |
| 4,673,560 | 6/1987 | Masse | 423/532 |

FOREIGN PATENT DOCUMENTS 889652 12/1981 U.S.S.R. .................... 423/522

Primary Examiner—Robert L. Stoll
Assistant Examiner—Robert M. Kunemund
Attorney, Agent, or Firm—Bruce M. Kanuch

[57] ABSTRACT

The present invention provides an apparatus for generating a reagent of sulfur trioxide in a carrier which includes a reagent generator. The reagent generator has associated therewith means for introducing a source of sulfur trioxide into the reagent generator, means for introducing a carrier such as a liquid halocarbon or an inert gas into the reagent generator, and means for introducing oleum into the reagent generator. The reagent generator also includes means for contacting the sulfur trioxide, carrier, and oleum to provide a reagent of sulfur trioxide in the carrier. Additionally, the system includes means for removing oleum from the reagent generator, as well as means for removing the reagent from the reagent generator. In a preferred embodiment, the system for generating the reagent also includes, in conjunction with the reagent generator, a treatment chamber for the surface treatment of polymer resins including medical products which have polymeric resin material on exposed surfaces thereof.

8 Claims, 3 Drawing Sheets

APPARATUS FOR THE GENERATION OF SULFUR TRIOXIDE REAGENT AND SULFONATION OF THE SURFACE OF POLYMERIC RESINS

BACKGROUND OF THE INVENTION

This invention relates to an apparatus for the generation and recycling of a sulfur trioxide reagent in a carrier, and, more particularly, to a system incorporating such sulfur trioxide reagent generating apparatus for the surface treatment and sulfonation of polymeric materials.

Sulfonation of polymeric resins, that is, the introduction of the —$SO_3^-$ or —$SO_3H$ functional group onto the surface of polymeric materials is generally known. See, for example, Walles patents No. 2,832,696; 2,937,066; 3,592,724; 3,613,957; 3,625,751; 3,629,025; 3,770,706; 3,959,561; 4,220,739; and 4,615,914. Typically, the sulfonation is carried out by using gaseous mixtures of dry air containing from 2 to 8% sulfur trioxide which are then reacted with the polymeric material. Several known systems may be used to produce the sulfur trioxide. For example, oleum (concentrated sulfuric acid containing sulfur trioxide) ($H_2S_3O_{10}$) has been used as a source of sulfur trioxide gas. In such a system, dry air is passed through the oleum to facilitate sulfur trioxide stripping of the oleum by mass transfer.

Cameron et al, U.S. Pat. No. 4,663,142 discloses a continuous process for the generation of sulfur trioxide from oleum which introduces oleum feed to a sulfur trioxide desorption tower to form a gaseous mixture of dry air and sulfur trioxide. Masse et al, U.S. Pat. No. 4,673,560 teaches a process and apparatus for the generation of sulfur trioxide using microwave energy. A sulfur trioxide-rich oleum feed is subjected to microwave energy for a time sufficient to produce a sulfur trioxide vapor which is then mixed with dry air. In both processes, large amounts of spent acid are produced which must be disposed of or recycled in some manner. See also, Walles U.S. Pat. No. 4,615,914, which teaches conversion of solid pills of polymeric sulfur trioxide into an air-sulfur trioxide gas mixture via microwave energy. This process leaves no residue.

One use of sulfur trioxide has been the surface treatment of a variety of polymeric resins to chemically modify their surfaces by a sulfonation reaction. For example, such surface sulfonated polymers are useful as substrates for painting and metal coating and are also useful as enclosure members for containing hydrocarbons such as gasoline and the like. Exemplary uses include containers such as gasoline and other fuel tanks, fuel barrels and drums, oleaginous food containers such as bags, tubs and cartons; fibrous materials for use in carpets, clothing and other fabric; plastic substrates and metal-clad plastics such as capacitors, auto parts and the like; and plastic substrates for use in electrostatic spray painting and the like.

Likewise, various medical devices are fabricated of or contain a variety of polymeric resins such as polycarbonates, polyurethanes, polysiloxanes and polyolefins. These polymeric resins are used to form housings, tubes, valves, and the like. Many of these medical devices are designed to come into contact with blood or other body fluids, either during removal from the body, during treatment of the fluid, or during the return of the fluid to the body. For example, such devices may include blood filters, blood oxygenators, dialyzers, tubing and the like. One basic requirement for all such medical devices is that the surfaces which contact the blood or other body fluid of a patient be water wettable.

Wettability is needed to prevent air bubbles from sticking to a surface and ending up in a patient's blood, or causing irregular flow through a tube or the like. Wettability is also important for preventing blood from sticking to or coagulating on a surface. However, most, if not all, of the plastic resins utilized in such medical devices have hydrophobic surface properties. Sulfonation of such surfaces becomes necessary to modify the surface properties of such resins to make those surfaces hydrophilic.

However, because such devices are to be used in medical applications and are designed to come into contact with body fluids, the sulfonation reaction must be controlled carefully. The strength of the sulfur trioxide reagent must be maintained within strict limits. If the strength of the reagent varies during treatment, the surfaces of the devices may be inadequately sulfonated necessitating the discarding of such devices. Additionally, the presence of even trace amounts of water may cause the formation of sulfuric acid which may adhere as small droplets to the surfaces of the plastic to be treated and cause local irregularities. Finally, the generation of sulfur trioxide reagent as well as treatment of the surfaces of these products requires large volumes of the highly dilute sulfur trioxide reagent to be passed through the system. This results in large volumes of acid waste which must be properly disposed of or recycled in some manner.

Accordingly, there remains a need in the art for a system for generating sulfur trioxide in controllable concentrations, and with an absolute minimum of impurities for the surface treatment and sulfonation of polymeric resin materials, particularly those used in medical devices. Further, there remains a need for a system which minimizes the amount of waste acid which requires disposal.

SUMMARY OF THE INVENTION

The present invention meets those needs by providing a system for the production of sulfur trioxide reagent and the use of the sulfur trioxide reagent so generated for the surface treatment of polymeric resin materials. The apparatus of the present invention delivers a stream of sulfur trioxide reagent and maintains the reagent stream within narrow, but adjustable concentration limits. Further, the apparatus of the present invention receives and upgrades a waste stream of spent reagent, and discharges only a very small stream of waste, all in a single integrated generator-reactor-separator.

The sulfur trioxide reagent is a reagent of sulfur trioxide in a carrier. The carrier may be either a liquid halocarbon which is described below as the preferred embodiment or an inert gas such as dry air which is described below as the alternative embodiment.

In either event, associated with the reagent generator is a means for introducing a source of sulfur trioxide into the reagent generator. The source of sulfur trioxide may be gaseous sulfur trioxide or sulfur trioxide in a liquid vehicle, such as oleum containing 10–90% sulfur trioxide. The introduction means may be a means for introducing a source sulfur trioxide into a separate contact chamber and, from there, to the reagent generator along with the recycled spent reagent of sulfur trioxide in carrier. The reagent generator also has associated with it a means for introducing the carrier to the reagent generator. That may be either a means for introducing a liquid halocarbon or an inert gas. Finally, the reagent generator has associated with it a means for introducing oleum therein.

In the reagent generator, the sulfur trioxide, carrier and oleum are brought into contact by the mixing which may occur by reason of the force of the introduction of these materials, and a sulfur trioxide in carrier reagent is produced. There is a means for removing the reagent to a treatment chamber. There is also a means for removing oleum from the reagent generator for the purpose of regeneration and recycling. Residual oleum may be removed from the sulfur trioxide in carrier reagent with, for example, a filter and joined with the oleum from the reagent generator prior to waste removal and recycling. The overall system is, thus, one which provides for recycling and reuse of the various components.

With reference to the preferred embodiment of the present invention, an apparatus for generating and recycling a solution of sulfur trioxide in a liquid halocarbon as the carrier is provided. Associated with the reagent generator is a means for introducing a source sulfur trioxide into the reagent generator, means for introducing a halocarbon into the reagent generator, and means for introducing oleum into the reagent generator. The reagent generator also includes means for contacting the sulfur trioxide, halocarbon, and oleum to provide a solution of sulfur trioxide in the halocarbon. Additionally, the system includes means for removing oleum from the reagent generator, as well as means for removing the sulfur trioxide in halocarbon solution from the reagent generator. This is readily accomplished due to the immiscibility of the halocarbon and oleum as well as the differences in density between the two and the high solubility of sulfur trioxide in the halocarbon.

The system of the present invention further includes means for recycling the oleum removed from the reagent generator back to the reagent generator to reduce the amount of waste. Further, a filter for removing residual oleum from the solution of sulfur trioxide in halocarbon is provided to prevent the retention of any sulfuric acid in the reagent feed stream. The oleum removed from the solution may also be recycled to the reagent generator for reuse.

In the preferred embodiment, the system for generating the sulfur trioxide reagent solution also includes, in conjunction with the reagent generator, a treatment chamber in the parts treatment loop for the surface treatment of polymer resins. For example, medical devices which have polymeric resin material, grease, dust, bacteria and moisture on exposed surfaces thereof may be treated therein. The medical devices treated by the system, in addition to being sulfonated, are substantially free of moisture, dust, grease and bacteria and are therefore clean and sterile. The system further includes means for feeding the reagent solution of sulfur trioxide in halocarbon to the treatment chamber, and means for recycling spent sulfur trioxide in halocarbon solution back to the reagent generator.

In this embodiment of the invention, the filter is positioned between the reagent generator and the treatment chamber for removing residual oleum from the reagent solution of sulfur trioxide in halocarbon. Further, the source of sulfur trioxide, halocarbon, and spent sulfur trioxide in halocarbon solution may be contacted in a separate chamber prior to being sent to the reagent generator.

In the other embodiment of the invention, an apparatus for generating a gaseous mixture of sulfur trioxide in inert gas as the carrier is provided. The inert gas may be air, nitrogen, oxygen, carbon dioxide, argon, helium, or other inert gases such as low boiling halocarbons. Dry air is preferred. The apparatus includes a reagent generator, a source of oleum, means for introducing a source of sulfur trioxide, means for introducing the oleum into the reagent generator. The reagent generator includes means for contacting the sulfur trioxide, inert gas and oleum to provide a gaseous reagent mixture of sulfur trioxide in inert gas. Finally, means for removing oleum from the reagent generator and means for removing the gaseous mixture of sulfur trioxide in inert gas from the generator are also provided.

The apparatus may also include means for recycling the oleum removed from the reagent generator back to the reagent generator. Additionally, a filter is provided for removing residual oleum from the gaseous mixture of sulfur trioxide in inert gas.

In this embodiment of the invention, the apparatus also includes, in conjunction with the reagent generator, a treatment chamber in the parts treatment loop for the surface treatment of polymer resins. For example, medical products which have polymeric material on exposed surfaces thereof may be treated therein. The system further includes means for feeding the gaseous mixture of sulfur trioxide in inert gas to the treatment chamber, and means for removing the spent gaseous mixture of sulfur trioxide in inert gas from the treatment chamber.

In this embodiment of the invention, the filter is positioned between the reagent generator and the treatment chamber to remove residual oleum from the gaseous reagent mixture of sulfur trioxide in inert gas. Further, the source of sulfur trioxide and the spent sulfur trioxide in inert gas may be contacted in a separate chamber prior to being sent to the reagent generator.

Accordingly, it is an object of the present invention to provide an apparatus for the generation of sulfur trioxide in a carrier and for using the sulfur trioxide in a carrier in the sulfonation of surfaces of polymeric resin materials. This, and other objects and advantages of the present invention, will become apparent from the following detailed description, the accompanying drawings, and the appended claims.

DETAILED DESCRIPTION OF THE PREFERRED EMBODIMENTS

Figure 1:
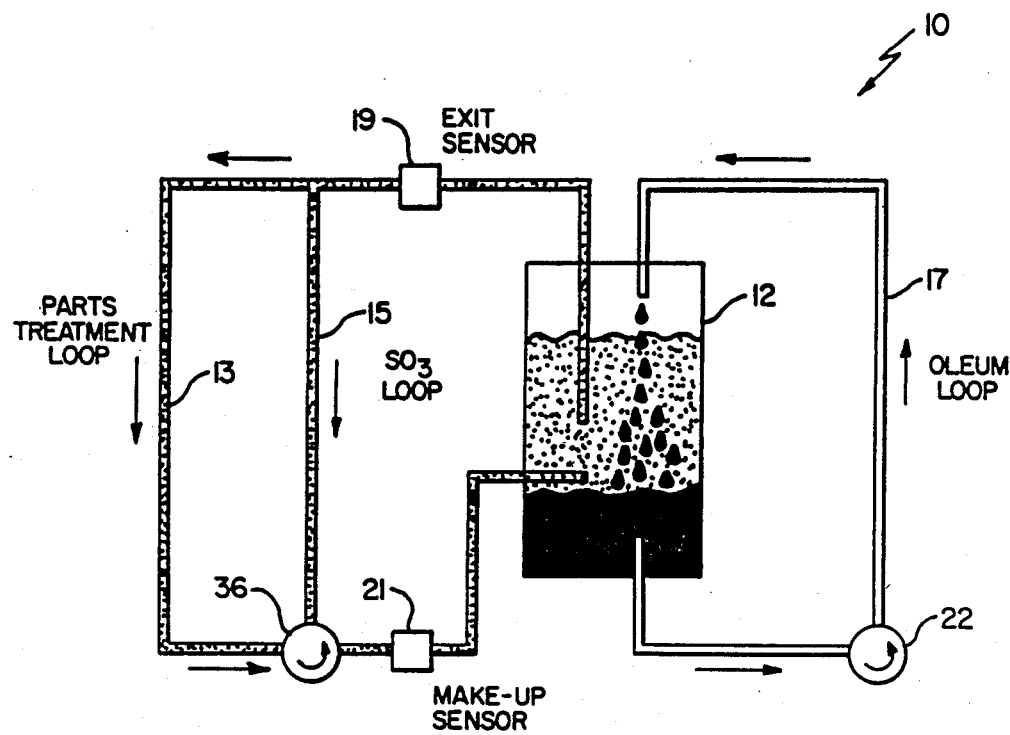
FIG. 1 is a schematic diagram of the system of the present invention.

Referring now to FIG. 1, there is illustrated in schematic form one embodiment of the system of the present invention. The system, generally indicated at 10, includes a reagent generator 12, a parts treatment loop 13, a sulfur trioxide recycle loop 15 and an oleum recycle loop 17. Pumps 22 and 36 are used in oleum recycle loop 17 and sulfur trioxide recycle loop 15, respectively.

Likewise exit sensor 19, which senses the concentration of sulfur trioxide in liquid halocarbon reagent solution, and make-up sensor 21, which senses the concentration of sulfur trioxide in returning carrier are provided. More detailed schematic diagrams of the two embodiments of the present invention are shown in FIGS. 2 and 3, where like reference numerals have been used for like parts.

Figure 2:
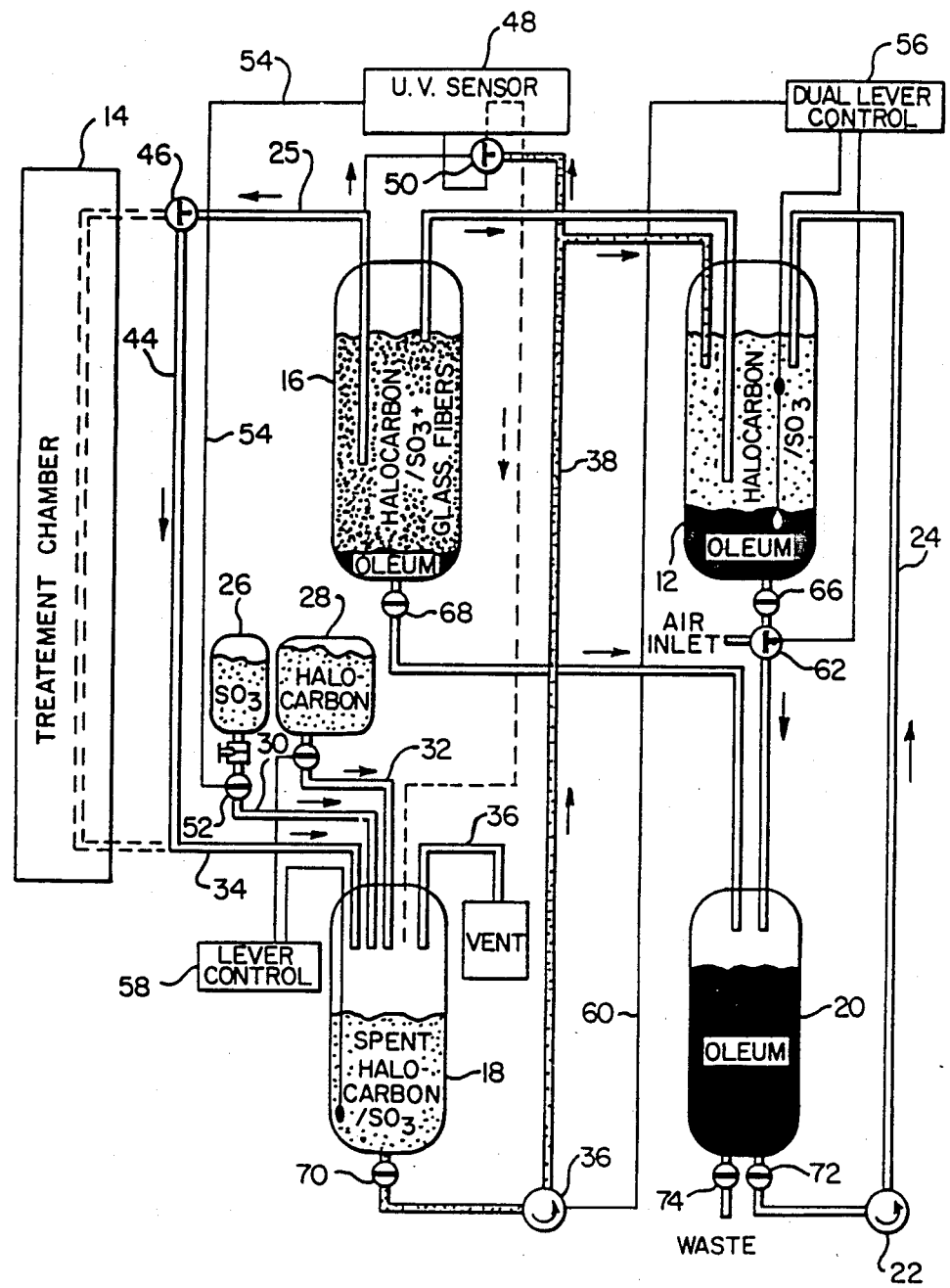
FIG. 2 is a more detailed schematic diagram of one embodiment of the apparatus of the present invention.
Figure 3:
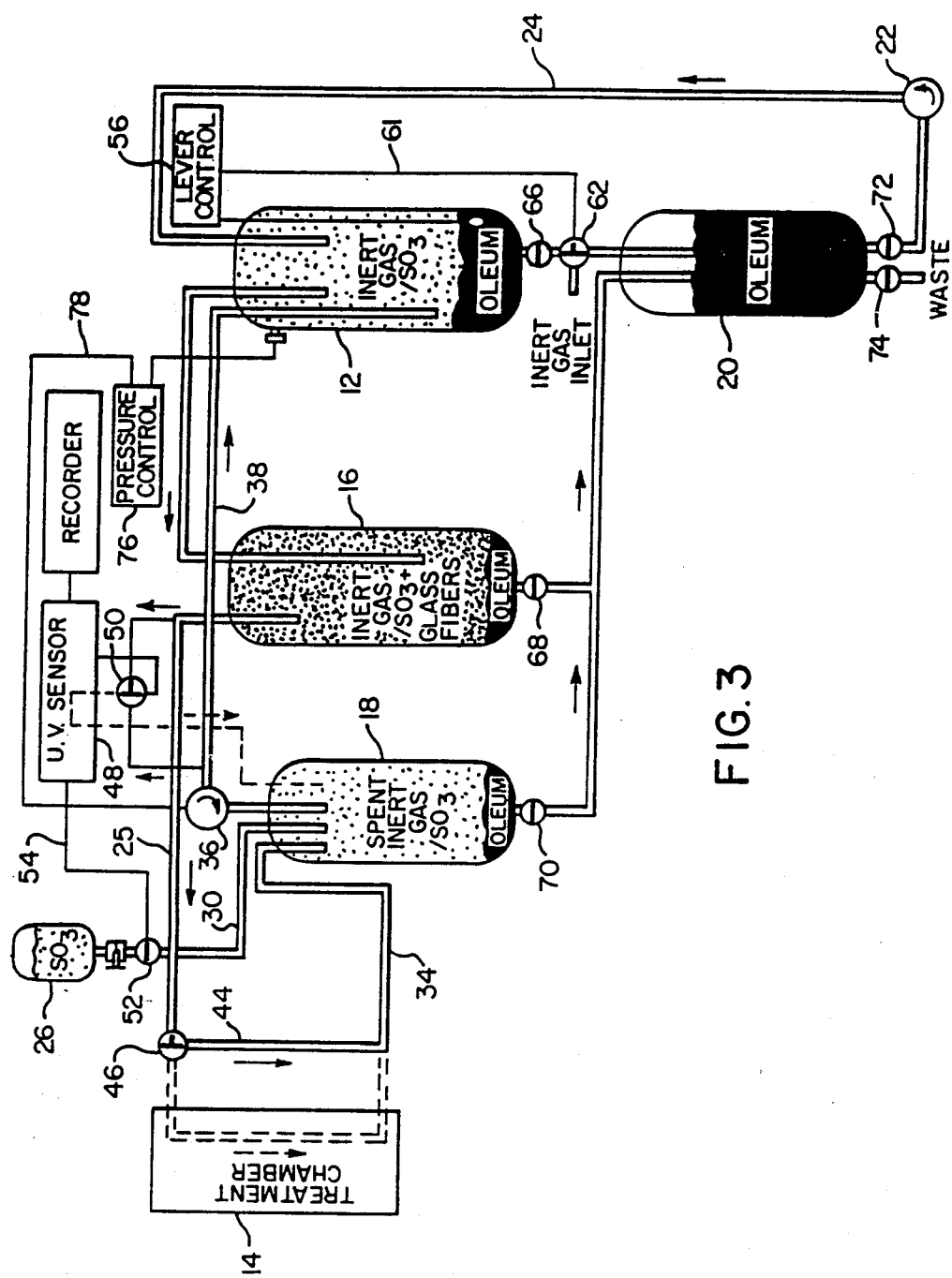
FIG. 3 is a more detailed schematic diagram of another embodiment of the apparatus of the present invention.

In FIG. 2, a treatment chamber 14 for the surface treatment and sulfonation of polymer resin materials is shown located in parts treatment loop 13 and a final filter 16 is positioned between reagent generator 12 and treatment chamber 14. System 10 as shown in FIG. 2 also preferably includes a separate contact chamber 18 for contacting spent sulfur trioxide solution, a source of fresh sulfur trioxide, and halocarbon prior to being sent to reagent generator 12. An oleum source 20, communicating with reagent generator 12 is also provided.

Oleum is provided to reagent generator 12 from an oleum source 20 which may be a suitable storage container or chamber. The oleum is pumped by pump 22 through line 24 into reagent generator 12. Preferably, the oleum source utilized contains from about 0.05–95% and preferably 10–60% free sulfur trioxide.

Both sulfur trioxide and the halocarbon may be added directly to reagent generator 12, which in this instance is a reagent solution generator. However, in the preferred apparatus as shown, a sulfur trioxide source 26 and a halocarbon source 28 are provided, and both the sulfur trioxide and halocarbon are metered through lines 30 and 32, respectively, into contact chamber 18. Spent sulfur trioxide in halocarbon solution from treatment chamber 14 and/or diverted sulfur trioxide in halocarbon solution from filter 16 may also be sent to contact chamber 18 via line 34. Line 36 is provided to vent vapors formed in contact chamber 18 to atmosphere. The mixture of sulfur trioxide, halocarbon, and spent sulfur trioxide-halocarbon solution are sent from contact chamber 18 to reagent generator 12 using pump 36 and line 38.

Sulfur trioxide may be supplied either as a gas or preferably in a liquid vehicle from source 26. The halocarbon is provided as a liquid. Suitable halocarbons for use in the present invention include those relatively low molecular weight halocarbons which are liquids at temperatures below about 25 degrees C., have viscosities below about 200 centipoise, have densities which differ from the density of oleum (approx. 1.8–1.9), are substantially insoluble in oleum, and do not contain any carbon to hydrogen bonds. With respect to the latter requirement, any halocarbon containing carbon to hydrogen bonds would itself become sulfonated and soluble in oleum.

Examples of suitable halocarbons for use in the practice of the present invention include tribromofluoromethane, dibromochlorofluoromethane, bromodichlorofluoromethane, 1-bromo-1,1-dichlorotrifluoroethane, 1,2-dibromotetrafluoroethane, pentachlorofluoroethane, 1,2-difluorotetrachloroethane, 1,1,1-trichlorotrifluoroethane, 1,1,2-trichlorotrifluoroethane, trichlorofluoromethane, and other fluorinated or chlorinated alkyl hydrocarbons containing from 1 to 7 carbon atoms. A preferred halocarbon for use in the present invention is Freon 113, a trichlorotrifluoroethane available from E. I. du Pont de Nemours.

Reagent generator 12 functions not only as a mixer-separator, but also as a chemical reactor. The sulfur trioxide source, halocarbon, and oleum components of the mixture are introduced into reagent generator 12 with sufficient force to mix the components and provide contact among them so as to produce a reagent sulfur trioxide in halocarbon solution having a sulfur trioxide concentration of between about 0.001 to about 10%, and more preferably about 0.4 to about 2%. Alternatively, a mixing means such as a mechanical stirrer may be used to aid in mixing the sulfur trioxide, halocarbon, and oleum.

Unlike the prior art, the oleum in reagent generator 12 does not function solely as a source of sulfur trioxide. Instead the oleum acts to remove impurities from the system as more fully described in copending application Ser. No. 07/190,312, filed on an even date herewith.

As set forth in that copending application, commercially available liquid halocarbons contain traces of both water and hydrocarbon impurities, such as pentane and/or partly halogenated lower alkanes. When such hydrocarbon impurities are not removed from the system, the sulfur trioxide in the halocarbon reagent solution takes on a brown color. When moisture is not removed from the system, the reagent solution becomes cloudy. Likewise, commercially available sources of sulfur trioxide often contain boron oxide ($B_2O_3$) or its corresponding sulfate as an impurity. Oleum usually contains heavy metal sulfate originating from corrosion of metal surfaces with which it has come in contact. In addition, as previously mentioned there are impurities introduced into the system from the polymer resin treatment. These impurities include moisture, grease, polymer fragments, dust, bacteria, and the like.

In the present system these impurities, as well as any heavy metal impurities in the oleum itself, are directed to and confined to the oleum portion of the system and do not contaminate the sulfur trioxide in halocarbon reagent solution. Thus, some of the sulfur trioxide present reacts with any moisture present to form $H_2S_3O_{10}$ which is insoluble in the halocarbon and becomes a part of the oleum solution in reagent generator 12. Further, trace hydrocarbon impurities, such as pentane, also react with the sulfur trioxide, become sulfonated, to form, for example, pentanesulfonic acid, and dissolve in the oleum. Again, such sulfonated hydrocarbons are not soluble in the halocarbon and are, thus, confined to the oleum portion of the system.

Any boron oxide present exists as a boron trisulfonic acid ($B(OSO_3H)_3$) which when brought into contact with the oleum in reagent generator 12 dissolves therein. The boron sulfonic acid is not soluble in the halocarbon and, therefore, is not a part of the sulfur trioxide in halocarbon reagent solution.

The sulfur trioxide in halocarbon solution in contacting the polymer resin to be treated, not only sulfonates the polymer, but also reacts with any moisture, grease, polymer fragments (monomer, low molecular weight polymer, etc.), dust, bacteria and the like to produce various sulfonic acids. The spent sulfur trioxide in halocarbon solution which is recycled to contact chamber 18 from treatment chamber 14 will coantain those sulfonated impurities. Upon being reintroduced into reagent generator 12 and thereby brought into contact with the oleum, the sulfonated impurities dissolve in the oleum, the sulfur trioxide in halocarbon solution is purified and the described process begins again or simply continues, depending on whether a discontinuous batch or continuous treatment cycle is involved. Thus the reagent generator 12 acts as a gravity separator providing an upper level layer of pure sulfur trioxide in halocarbon reagent solution and a lower level of oleum containing sulfonated impurities. This gravity separation is readily accomplished because of the density differences between the halocarbon and oleum solutions and their immiscibility.

Of course, it will be recognized by those skilled in the art that a halocarbon liquid having a density greater than that of oleum may be selected. In that case, the sulfur trioxide in halocarbon reagent solution would form the lower layer in reagent generator 12, and the connections for the output lines from the reagent generator would be changed.

The concentration of sulfur trioxide in the halocarbon may be closely controlled in the system of the present invention to within a few parts per million. This is accomplished by maintaining a known concentration of oleum in reagent generator 12, controlling the addition of sulfur trioxide to the generator, and measuring the temperature therein. The distribution coefficient for free sulfur trioxide between the halocarbon and oleum solutions can be calculated readily for any given temperature. By adding sufficient make-up sulfur trioxide to the reagent generator, a controllable concentration of free sulfur trioxide will be distributed to the liquid halocarbon phase. The concentration of sulfur trioxide in halocarbon can be analytically determined by titration with a base, but preferably it is determined by an in line sensor 48 such as an ultraviolet spectrophotometer. The output signal from sensor 48 can be used to control valves 50 and 52 as explained more fully below.

Fresh reagent sulfur trioxide in halocarbon solution leaving reagent generator 12 is first sent through filter 16 to remove any last traces of oleum which may be suspended in the solution. Filter 16 contains a filter medium such as glass wool fibers which act to entrap and remove any oleum. As shown, the oleum drained from filter 16 is recycled to oleum source 20. It may alternatively be sent to sulfur trioxide source 26 or contact chamber 18. The sulfur trioxide in halocarbon reagent solution is sent to treatment chamber 14 via line 25.

Further, an internal circulating line 44 is provided to connect line 25 carrying the output from filter 16 to line 34 which is the input line for contact chamber 18. This permits the system to fully circulate and balance the sulfur trioxide in halocarbon solution even when there is no treatment taking place in treatment chamber 14. Changing the system over from recirculation to treatment is accomplished by a valve, such as rotating T-valve 46.

Within treatment chamber 14 are placed the polymer resins to be treated. Alternatively in some instances the reagent may be flowed directly through the part to be treated (i.e. when the part is configured so as to have a substance such as blood or other body fluid flowed through it in use). In that instance the part itself becomes the treatment chamber. In a preferred embodiment of the invention, the polymer resins form medical devices or parts thereof. However, it will be apparent that the system of the present invention can be used to treat and sulfonate the surfaces of a number of polymer resins for a variety of purposes. The sulfur trioxide in halocarbon reagent solution interacts with the polymer surface not only to clean and sterilize it, but also to chemically react with it.

The sulfur trioxide removes low molecular weight polymer impurities from the surface as well as processing aids which may remain on the surface of the polymer from an earlier polymerization procedure. Further, the sulfur trioxide combines with water in the cells of any bacteria present on the surface of the polymer resin to produce sulfuric acid which destroys the cell membranes of the bacteria. Some of the polymer fragments and dead bacteria will be removed by the sulfur trioxide in halocarbon solution as it is circulated through the device. Additional surface impurities will be removed by later washing and rinsing steps.

The sulfur trioxide also reacts with carbon to hydrogen bonds at the polymer surface to provide one or a number of monolayers of sulfonic acid functional groups at the polymer surface. Such sulfonic acid functional groups provide a number of desirable properties to the polymer surface. These include water wettability, antistatic, non-dust attracting, and nonfogging surface. Further, the resulting surface releases air bubbles more readily and is slippery to blood and other body fluids to prevent coagulation. Finally, the sulfonated surface provides a reactive functional group to which other bio-active compounds can be bonded.

In a preferred form, the system of the present invention may be automatically controlled through the use of sensors and controllers. As shown in FIG. 2, a sensor 48 is provided which monitors the concentration of sulfur trioxide in halocarbon solution at the output of filter 16 and just prior to the entry of sulfur trioxide in halocarbon solution into reagent generator 12. Samples of solution may be drawn from either of lines 25 or 38 and sent through sensor 48 which may sense the concentration of sulfur trioxide in the solution directly or indirectly by measuring the density, refractive index, or the adsorption of ultraviolet light at a selected wavelength. A valve, such as T-valve 50, may be actuated and rotated by a suitable controller (not shown) to switch the sampling from line 25 to line 38.

In either event, based on the concentration of sulfur trioxide sensed by sensor 48, valve 52 at sulfur trioxide source 26 may be actuated, as shown schematically by line 54, to provide additional sulfur trioxide to contact chamber 18 as needed.

The levels of liquid in reagent generator 12 and contact chamber 18 are regulated by level controllers 56 and 58, respectively. Level controller 56 is preferably a dual level control device which can sense the level of both the oleum and halocarbon phases in reagent generator 12. As shown schematically, when additional make-up sulfur trioxide in halocarbon solution is needed in reagent generator 12, level controller 56 activates pump 36 via line 60. If the level of oleum in reagent generator 12 rises too high, level controller 56 actuates a valve such as T-valve 62, to rotate it from its position of open to atmosphere to a second position to drain oleum from generator 12 into oleum source 20.

Level controller 58 senses the level of liquid halocarbon in contact chamber 18. As additional liquid is required, level controller 58 actuates valve 64 to supply additional make-up halocarbon to contact chamber 18. Additional valves 66, 68, 70, and 72 are provided at the respective bases of generator 12, filter 16, contact chamber 18 and oleum source 20. While these valves are normally in the open position during operation of the system, they may be closed as needed. Further, valve 74 is provided at the base of oleum source 20 to bleed off a small portion of the oleum for disposal.

Preferably, contact chamber 18, sulfur trioxide source 26, and halocarbon source 28 are operated at atmospheric pressure, while reagent generator 12 and filter 16 are maintained at slightly above atmospheric pressure. Oleum source 20 contains trapped air under hydrostatic pressure from generator 12.

In another embodiment of the invention shown schematically in FIG. 3, and where like elements are represented by like reference numerals, sulfur trioxide is mixed with an inert gas such as dry air as the reagent for treatment. The system includes reagent generator 12 (which in this instance is a gaseous reagent generator), treatment chamber 14, filter 16, contact chamber 18, and oleum source 20. In this embodiment of the invention, inert gas supplied through inert gas inlet 29, is provided in reagent generator 12 in place of the liquid halocarbon of the previous embodiment.

The sulfur trioxide in inert gas reagent is produced in reagent generator 12 by contacting make-up sulfur trioxide and inert gas from contact chamber 18 with oleum provided from source 20. The sulfur trioxide in inert gas reagent is then sent to filter 16 for removal of any traces of oleum prior to being sent to treatment chamber 14.

In treatment chamber 14, the reagent contacts the surfaces of the polymer resins contained therein or when the treatment chamber 14 is the part itself, the reagent contacts the internal polymer resin surfaces of that part. Again, preferably, the polymer resins form a part or all of a medical device. The sulfur trioxide removes surface impurities, sterilizes the resin surface, and reacts with the surface to sulfonate it. Spent sulfur trioxide in inert gas is then recycled to contact chamber 18 through line 34, which is the input line for contact chamber 18.

Again, the system is preferably automatically controlled. Sensor 48 samples both the reagent mixture leaving filter 16 as well as the spent sulfur trioxide in inert gas mixture in contact chamber 18. Based on the concentrations sensed, a controller (not shown) actuates a valve, such as T-valve 52, to supply additional make-up sulfur trioxide as needed from sulfur trioxide source 26.

The pressure in reagent generator 12 is sensed by pressure controller 76. If additional sulfur trioxide in inert gas is required, controller 76 activates pump 36 via line 78 to provide the additional amount of sulfur trioxide in inert gas. Level controller 56 senses the level of oleum in generator 12 and actuates a valve, such as T-valve 62, through line 61 as necessary to drain excess oleum from the reagent generator. A small amount of oleum is bled from the system through valve 74 as required and is disposed of by suitable means.

Again, sulfur trioxide source 26 and contact chamber 18 are maintained at atmospheric pressure while reagent generator 12 is maintained at slightly above atmospheric pressure. Inert gas is also supplied to oleum source 20 at slightly above atmospheric pressure.

As can be seen, both embodiments of the present invention provide systems for the production of sulfur trioxide reagent which may then be used in the surface treatment and sulfonation of polymeric resin materials. The system of the present invention delivers a stream of sulfur trioxide reagent while maintaining the concentration of sulfur trioxide in the reagent within narrow, but adjustable, limits. Further, the system of the present invention minimizes waste acid by receiving and upgrading spent reagent all within an integrated reactor-separator chamber.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An apparatus for regenerating a reagent of sulfur trioxide in a carrier comprising:
   (a) a reagent generator having associated therewith means for introducing sulfur trioxide from a source of sulfur trioxide, oleum from a source of oleum, and a carrier selected from the group consisting of non-reactive liquid halocarbons and non-reactive gases into said reagent generator, and means to contact sulfur trioxide, a carrier, and oleum to form a reagent phase containing a reagent and an oleum phase containing impurities, said reagent being sulfur trioxide in a carrier,
   (b) means for removing said reagent phase from said reagent generator,
   (c) means for feeding said reagent from said reagent phase to a treatment chamber and for treating a surface with said reagent and form spent reagent,
   (d) means for recycling said spent reagent to said reagent generator along with said sulfur trioxide from said source of sulfur trioxide,
   (e) means for removing said oleum phase from said reagent generator,
   (f) means for regenerating said oleum in said oleum phase to remove said impurities, and
   (g) means for recycling said regenerated oleum to said reagent generator along with said oleum from said source of oleum.

2. The apparatus of claim 1 including filter means positioned between said reagent generator and said treatment chamber for removing residual oleum from said reagent phase.

3. The apparatus of claim 2 including means for recycling said residual oleum back to said reagent generator.

4. The apparatus of claim 1 wherein said means for introducing said sulfur trioxide into said reagent generator includes means to introduce a source of sulfur trioxide into a separate contact chamber containing said spent reagent prior to being sent to said reagent generator with the recycled spent reagent.

5. A system for treating the surface of a polymeric resin material with sulfur trioxide comprising:
   (a) a reagent generator having associated therewith means for introducing sulfur trioxide from a source of sulfur trioxide, oleum from a source of oleum, and a carrier selected from the group consisting of non-reactive liquid halocarbons and non-reactive gases into said reagent generator and having means to contact sulfur trioxide, a carrier, and oleum to form a reagent phase containing a reagent and an oleum phase containing impurities, said reagent being sulfur trioxide in a carrier,
   (b) means for removing said reagent phase from said reagent generator,
   (c) a treatment chamber for said polymeric resin material,
   (d) means for feeding said reagent from said reagent phase to said treatment chamber and for treating a surface of said polymeric resin material with said reagent and form spent reagent,
   (e) means for recycling said spent reagent to said reagent generator along with said sulfur trioxide from said source of sulfur trioxide, (f) means for removing said oleum phase from said reagent generator, (g) means for regenerating said oleum in said oleum phase to remove said impurities, and (h) means for recycling said regenerated oleum to said reagent generator along with said oleum from said source of oleum.

6. The system of claim 5 including filter means positioned between said reagent generator and said treatment chamber for removing residual oleum from said reagent phase.

7. The system of claim 6 including means for recycling said residual oleum back to said reagent generator.

8. The system of claim 5 including a separate contact chamber in which a source of sulfur trioxide, a carrier and said spent reagent are contacted prior to being sent to said reagent generator.

* * * * *